United States Patent [19]
Watanabe et al.

[11] Patent Number: 6,166,450
[45] Date of Patent: Dec. 26, 2000

[54] CONTROL ASSEMBLY FOR A VEHICLE AND METHOD OF INSTALLATION

[75] Inventors: Nobuo Watanabe, Gamagori; Katsuhiro Katagiri, Kakamigahara; Hideyuki Naganawa, Ichinomiya; Akiyoshi Nagano, Ama-gun; Kenji Okamoto, Nagoya, all of Japan

[73] Assignees: Toyoda Gosei Co., Ltd.; Harness System Technologies Research, Ltd., both of Aichi-ken, Japan

[21] Appl. No.: 09/204,251

[22] Filed: Dec. 3, 1998

[30] Foreign Application Priority Data

Dec. 3, 1997 [JP] Japan .................................. 9-332908

[51] Int. Cl.[7] ...................................................... B60L 1/00
[52] U.S. Cl. ............................ 307/10.1; 307/9.1; 439/34; 701/36
[58] Field of Search .................................... 307/10.1, 9.1, 307/147; 439/34, 297, 544, 67; 701/36; 381/86; 108/45; 180/90

[56] References Cited

U.S. PATENT DOCUMENTS

| | | | |
|---|---|---|---|
| 4,924,957 | 5/1990 | Gigla | 180/90 |
| 5,255,155 | 10/1993 | Sugimoto et al. | 439/77 |
| 5,873,749 | 2/1999 | Takiguchi et al. | 439/34 |
| 5,889,337 | 3/1999 | Ito et al. | 307/10.1 |

FOREIGN PATENT DOCUMENTS 2-57437  2/1990  Japan .

*Primary Examiner*—Albert W. Paladini
*Attorney, Agent, or Firm*—Pillsbury Madison & Sutro LLP

[57] ABSTRACT

A control assembly for an automotive vehicle having an audio system and a climate control system, the control assembly having improved design characteristics, a reduced number of parts, and providing a reduced number of installation steps. The control assembly includes a control casing having a casing cover surface adapted to face an interior compartment of a vehicle and defining a plurality of openings therein, control elements adapted to produce operation signals for controlling the audio system and the climate control system, and an input-output section for receiving the operation signals and transmitting control signals for controlling the audio system and the climate control system. The input-output section is secured to the control casing so that the control elements are operably disposed on the cover surface through the openings. The casing cover, control elements and input-output section comprise an integral assembly that is easily installed in a production line of motor vehicles.

21 Claims, 4 Drawing Sheets

CONTROL ASSEMBLY FOR A VEHICLE AND METHOD OF INSTALLATION

The following priority application, Japanese Patent Application No. 9-332908, filed in Japan on Dec. 3, 1997, is hereby incorporated by reference into the present specification.

BACKGROUND OF THE INVENTION

1. Field of the Invention

The present invention relates to a control assembly for the interior of an automotive vehicle, and more particularly to a control assembly for controlling vehicle occupant systems such as an audio system or a climate control system.

2. Description of Related Art

The instrument panel of an automotive vehicle typically has an array of controls composed of various button switches, dials, levers, and the like for controlling vehicle occupant systems such as an audio system, a climate control system for adjusting interior temperature, or a car navigation system, among others. Various approaches have been taken to enhance the operation of the control array by vehicle occupants.

For example, as shown in FIG. 4, a conventional instrument panel has a center panel 100 provided in the interior compartment of the vehicle. The center panel 100 defines a window 101 and an opening 102, and has a cover surface 103 facing the interior compartment. Behind the center panel 100, a navigation device 200, compact disc (CD) drive 201, a tuner amplifier 202, and a cassette tape drive 203 are accommodated in and secured to a vehicle body with brackets 204. An air conditioning device (not shown) and a rear case 300 for attaching a climate control circuit board 301 are disposed under the cassette tape drive 203.

The navigation device 200, CD drive 201, tuner amplifier 202 and cassette tape drive 203 are electrically connected to an audio circuit board 205, which is secured to the vehicle body via these devices. The navigation device 200 is itself secured to the vehicle body with the brackets 204 and oriented so that a display screen appears in the window 101. A light leading lens 206 and audio-navigation control elements 207, such as various switches and dials, are disposed in front of the audio circuit board 205. The audio-navigation control parts 207 operably appear in the opening 102 of the center panel 100 through an audio cover face plate 208.

A climate control circuit board 301 is secured to a front surface of the rear case 300, and a light-leading lens 302 is disposed in front of the climate control circuit board 301. In addition, climate control elements 303, such as various button switches and dials, are also disposed in front of the climate control circuit board 301. The climate control elements 303 operably appear in the opening 102 of the center panel 100 through a climate control cover face plate 304 under the audio cover face plate 208.

To install the above-described functional devices and center panel 100 in a vehicle body, the following steps are taken. The navigation device 200 is installed in the vehicle body. The CD drive 201 and tuner amplifier 202 are assembled with the audio circuit board 205, light-leading lens 206, audio-navigation control parts 207 and audio face plate 208 to form a sub assembly and then the sub assembly is installed in the vehicle body. The cassette tape drive 203 is assembled with the rear case 300, climate control circuit board 301, light-leading lens 302, climate control elements 303 and climate control face plate 304 to form a sub assembly, and then the sub assembly is installed in the vehicle body. And finally, the center panel 100 is secured, thus completing the assembling and installing steps.

The above-described sequence of assembling and installing steps cannot, however, be accomplished with a desirable degree of productivity. The number of parts is high, which makes the assembling and installing work difficult, increases the number of steps required, and increases the time required to complete the task. Furthermore, a separation line appears between the audio face plate 208 and the climate control face plate 304 after assembly, which degrades the appearance of the instrument panel. Moreover, the placement of the audio-navigation control elements 207 and climate control elements 303 on the center panel is restricted, since they must be assembled with their corresponding face plates 208 and 304. The possible positions in which the controls 207 and 303 can appear are thus limited, thereby reducing the design options for the instrument panel.

SUMMARY OF THE INVENTION

It is an object of the present invention to provide a control assembly for a controlling vehicle occupant systems which has improved design characteristics and is formed with a reduced number of parts to reduce the number of installation and assembly steps required.

In accordance with a the first aspect of the present invention, a control assembly for an automotive vehicle includes a control casing including a cover surface facing an interior compartment of the vehicle, the control casing defining a plurality of openings. A plurality of control elements such as buttons, which are adapted to produce operation signals for controlling a plurality of vehicle occupant systems, are disposed at predetermined places in the vehicle. An input-output section is adapted to receive the operation signals resulting from operation of the control elements, and to transmit control signals based on the operation signals for controlling the plurality of vehicle occupant systems. The control elements are operably disposed on the casing cover surface through the openings, and the input-output section is secured to the control casing.

In accordance with another aspect of the present invention a control assembly for the automotive vehicle includes an input-output section including a plurality of switches for controlling a plurality of vehicle occupant systems. A plurality of occupant engageable control elements is provided for selectively operating the plurality of control devices. A control casing is provided facing the interior space of the vehicle, and defines openings in which the control elements are received for engagement by a vehicle occupant to control the plurality of vehicle occupant systems, the input-output section being secured to the control casing.

Preferably, the control devices are for controlling vehicle occupant systems including, for example, a climate control system, an audio system, and a navigation system. The control assembly may include a navigation control device cover, and the control casing may include a navigation control device cover receiving portion for suitably mounting the navigation control device cover.

The control casing may advantageously define a cavity opening into the interior space of the vehicle for receiving a display screen therein for viewing by a vehicle occupant. The casing cover may include a wall portion defining the cavity to orient the display screen in recessed disposition with respect to the interior space of the vehicle.

In accordance with yet another aspect of the present invention, a control assembly for the vehicle is installed by assembling together a plurality of control elements adapted to produce operation signals for controlling the operation of a plurality of vehicle occupant systems disposed at predetermined places in the vehicle, an input-output section adapted to receive the operation signals resulting from the operation of the control elements and to transmit control signals based thereon for controlling the plurality of vehicle occupant systems, and a control casing having a cover surface adapted to face an interior compartment of the vehicle. An integral assembly is formed from these components, and secured to the body of the vehicle so that the cover surface of the cover faces the interior compartment of the vehicle.

The control assembly of the present invention avoids a number of drawbacks in known arrangements. A plurality of circuit boards or the like are not needed for accomplishing control of a plurality of vehicle occupant systems, but rather a single input-output section can accomplish such control. Separate face plates for audio controls, climate system controls, and navigation system controls, among others, are also not needed, since the control elements can be mounted directly in the control casing itself. Consequently, the number of required parts is significantly reduced, resulting in a corresponding reduction in the number of parts being assembled and installation steps required. Furthermore, since a plurality of face plates are not required, separation lines do not appear on the cover surface, which produces a more pleasing aesthetic appearance. Moreover, design freedom is enhanced in that the control elements can be freely arranged across the cover surface as desired to enhance appearance, use and function.

Other objects, features, and characteristics of the present invention will become apparent upon consideration of the following description in the appended claims with reference to the accompanying drawings, all of which form a part of this specification.

DETAILED DESCRIPTION OF THE RESENTLY PREFERRED EMBODIMENT

Figure 1:
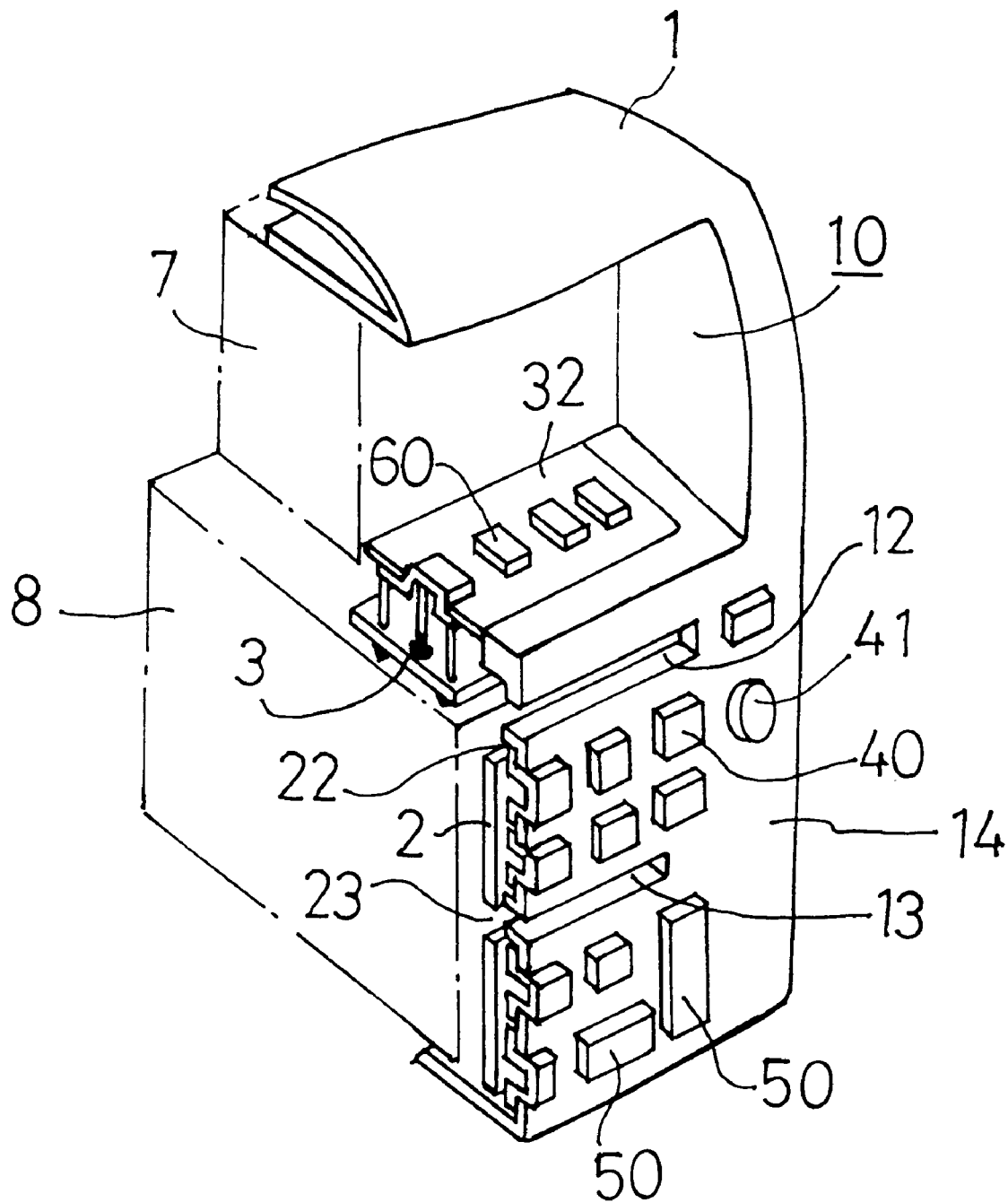
FIG. 1 is a perspective view in partial section showing an embodiment of a control assembly for an automotive vehicle in accordance with the present invention.
Figure 2:
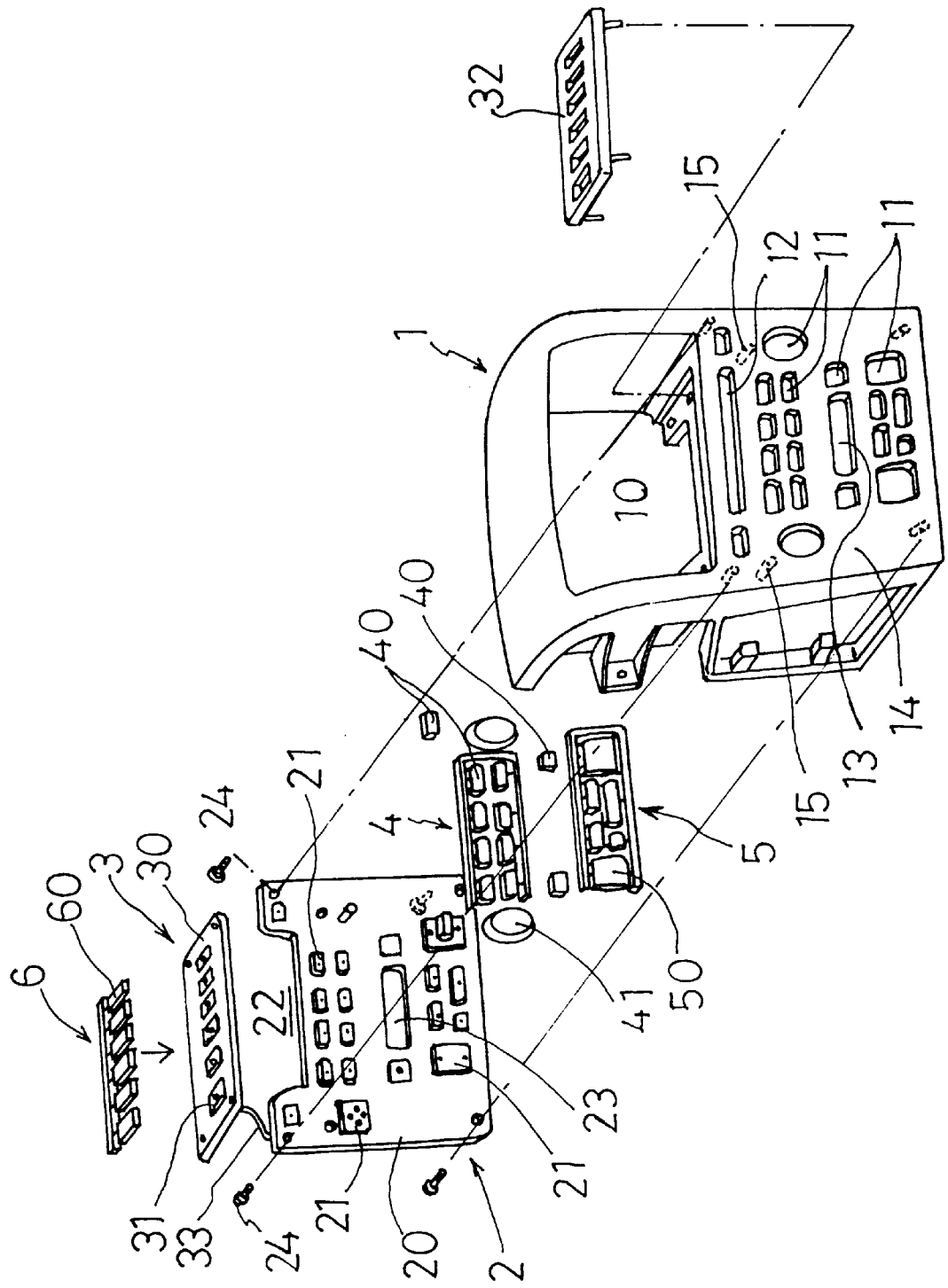
FIG. 2 is an exploded perspective view illustrating the control assembly of FIG. 1.

As shown in FIGS. 1 and 2, a control assembly for an automotive vehicle includes a casing cover 1, an input-output section in the form of a control device board 2 and a display board 3. Both the control device board 2 and the display board 3 are attached to the control casing 1. An audio control element 4 and a climate control element 5, each of which is composed of various switch members and/or switch covers, are adapted to be positioned to operatively mate with control devices 21 such as switches, variable resistors, levers, linkages, and the like, which are mounted on the control device board 2. A navigational control element 6, which is composed of various switch covers, is adapted to be positioned to operatively mate with control devices 31 which are mounted on the display board 3.

The control casing 1 has a shell-like configuration, and defines a window 10, a plurality of openings 11 from which the audio control elements 4 and climate control elements 5 project, a first slot 12 corresponding to a CD slot, and a second slot 13 corresponding to a cassette tape slot. The outer surface of the control casing 1 defines a cover surface 14. The control casing 1 can be formed to include both flat and curved surfaces, as illustrated in FIG. 2 but it is also within the scope of the present invention for the casing 1 to be shaped so as to have an entirely flat or an entirely curved cover surface. The control casing 1 can be disposed within the interior compartment of a vehicle as a console, a central panel, an instrument panel portion, door trim, or in any other disposition within the vehicle's interior compartment where it can be accessed by vehicle occupants. The openings 11 defined by the control casing 1 may each receive a single control element for engagement by a vehicle occupant, or may receive a number of such control elements.

The control device board 2 includes a main body 20, a plurality of various control devices 21 held on the main body 20 so as to partly project therefrom, and printed wiring and connection codes (not shown) which are formed on a reverse side of the main body 20. The control device board 2 further defines a notch 22 corresponding to a CD slot, and a slot 23 corresponding to a cassette tape slot.

The switches 21 mounted on the control device board 2 are configured to control audio devices such as a CD drive or CD changer, an AM radio tuner, an FM radio tuner, a cassette tape drive, an amplifier and the like, as well as various switches configured to control a climate control system including, for example, a heater, air conditioner, and ventilation system. The control device board 2 has bores which permits screws 24 to be engaged therein for attachment of the control device board 2 to a reverse side of the control casing 1.

The display board 3 includes a main body 30, a plurality of switches 31 mounted on the main body 30 so as to partly project therefrom, and printed wiring and connection codes (not shown) which are formed on the reverse side of the main body 30. The switches 31 mounted on the display board 3 are configured to control a navigation system and to permit occupants to select items displayed on a display screen by touch or with a stylus, as is well-known in the art. A navigation control device cover 32 and the display board 3 are joined to the control casing 1 at a floor portion of the window recess 10. The display board 3 is electrically connected to the control board 2.

The audio control element 4 is composed of control elements in the form of a button cover 40 adapted to cover push button switches 21 of the control device board 2, a dial 41 adapted to be attached to a variable resistor (not shown) of the control device board 2, and the like. The climate control element 5 is composed of control elements in the form of a button cover 50, while the navigation control element 6 is composed of a control element in the form of a button cover 60.

The button covers 40, 50 and 60 are formed so that a plurality of button cover portions, each configured for covering one or more buttons, are connected to each other by flexible web portions. In this manner, a single button cover 40 can cover a plurality of push button switches 21, and can flex so as to permit operation of certain of the button switches 21 without affecting the position of others of the button switches 21. The use of button covers 40, 50, and 60 advantageously reduces the number of parts in the control assembly, which brings about a corresponding decrease in the number of assembly steps required. It is within the scope of the present invention for the button covers to be configured to cover other forms of switch members, such as, for example, toggle switches or levers.

The audio control element 4 and the climate control element 5 are secured between the control device board 2 and the control casing 1 to cover the surfaces of the switches 21 of the control device board 2 where they project through openings 11 for engagement by a vehicle occupant. The navigation control element 6 is likewise disposed to cover the switches 31 of the display board 3 for engagement by a vehicle occupant. The display board 3 and the navigational control element 6 are, as noted above, joined to a floor portion of the window recess 10 along with the navigation control device cover 32, with the navigation control element 6 being oriented for access by a vehicle occupant.

The control assembly of the present invention is integrally composed of the control casing 1, the control device board 2, the display board 3, the audio control element 4, the heating control element 5, and the navigation control element 6. The incorporation of these components into an integral assembly greatly facilitates the installation of the control assembly in a vehicle body in a production line of motor vehicles.

Furthermore, the control assembly of the present invention does not use a plurality of face panels, as has been the case in conventional arrangements (see FIG. 1). Rather, a single control casing 4 is employed which provides an attractive appearance and simplifies assembly. As a result, the control assembly of the present invention is free from the separation lines present in conventional arrangements where face plates adjoin each other. Moreover, greater design flexibility is provided in the present invention, since the position of switches can be freely selected across the extent of the control casing 1, only being limited by the configuration of the input-output section embodied, for example, by the control device board 2 and the display board 3.

In addition, the control device board 2 and the display board 3 can readily be arranged in different configurations so as to be used in a wide variety of vehicles. Consequently, the number of parts used in various vehicles can be reduced, and production costs across a line of vehicles can thereby be reduced.

Figure 3:
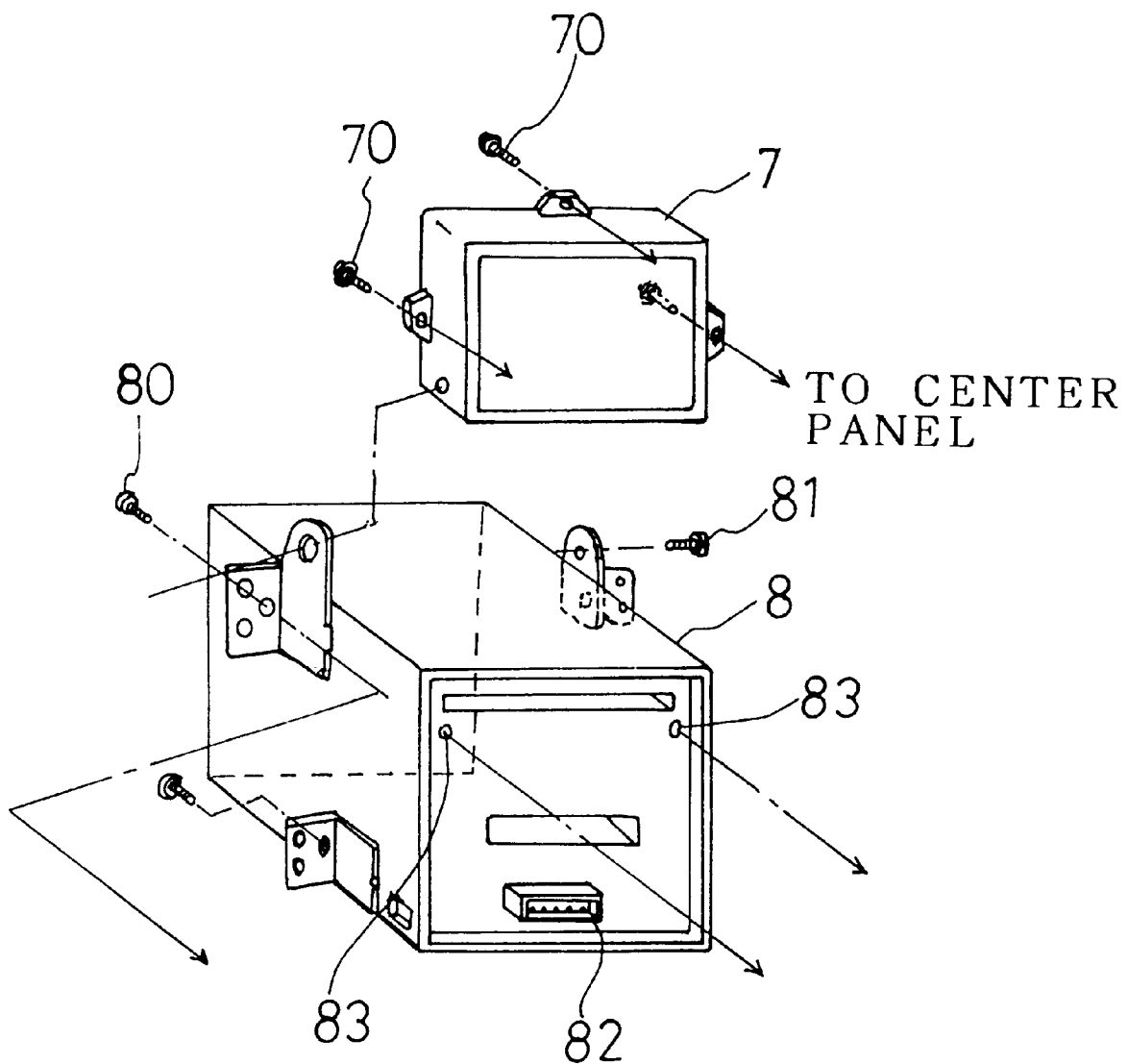
FIG. 3 is a perspective view of components adapted to be installed behind the control assembly of FIG. 2.
Figure 4:
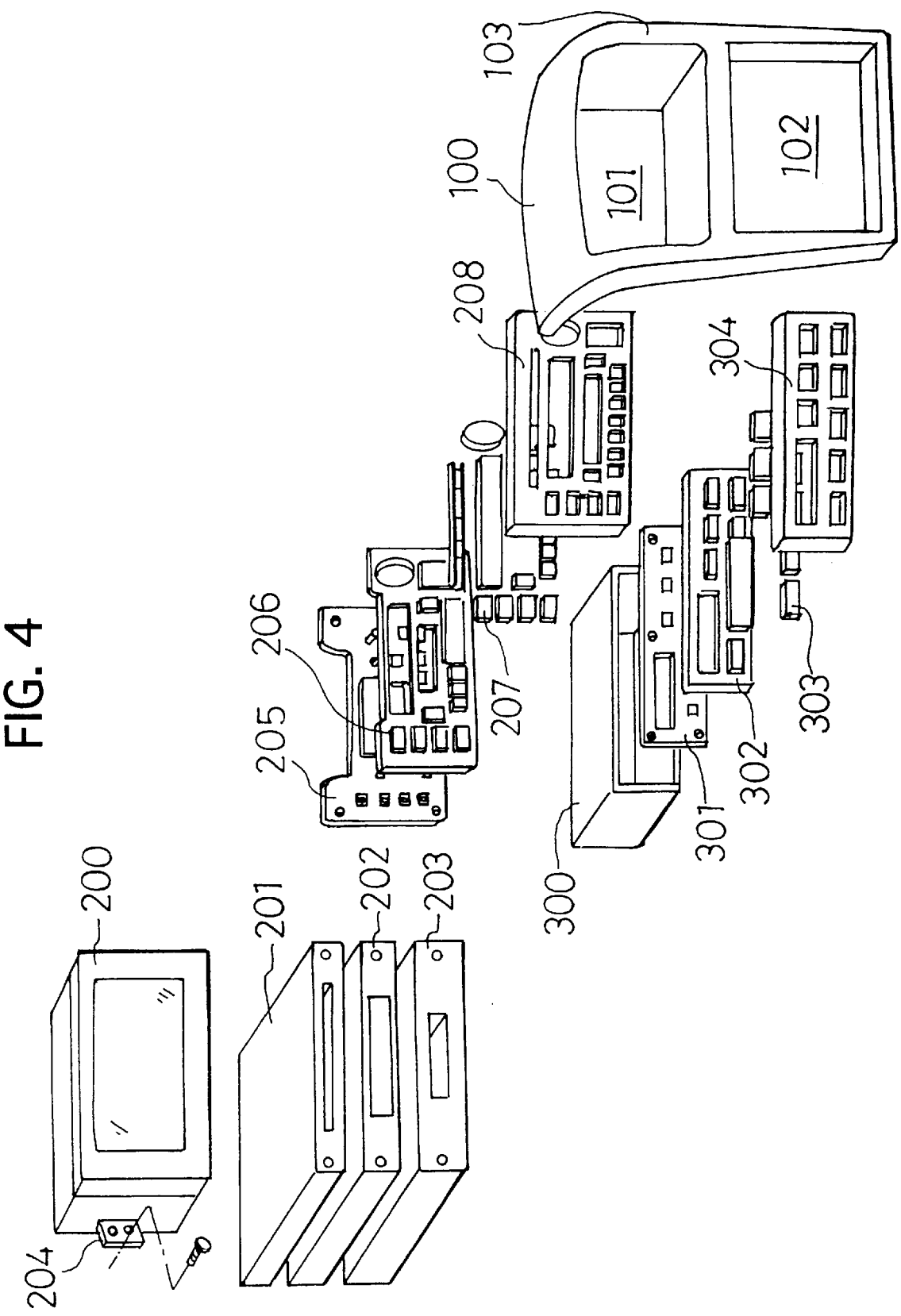
FIG. 4 is a perspective view illustrating a conventional control assembly.

The installation of the control assembly of the present invention can be quickly and easily accomplished. A navigational device 7 and a case 8, as shown in FIG. 3, are respectively secured to the control casing 1 by appropriate means, such as by screws 70, 80. The navigational device 7 is positioned so that a liquid crystal display screen appears in the window recess 10 for viewing by an occupant of the vehicle interior compartment.

Within the case 8, a CD drive, cassette tape drive, and tuner amplifier (not shown) are, for example, disposed. During installation, a pair of bosses 15, projecting from the reverse side of the control casing 1, are engaged with holes 83 provided in a front surface of the case 8, thus providing for accurate positioning of the case 8 with respect to the control casing 1. The navigational device 7 is secured to the case 8 with machine screws 81.

At this stage of assembly, each audio device installed in the case 8 is connected to a wiring harness (not shown) which extends from the control device board 2. The case 8 is provided with a connector 82 for providing an electrical connection to a connector (not shown) provided on the reverse side of the control device board 2, which thereby provides electrical connection between a remotely located air conditioner and the climate control switches 21 of the control device board 2.

Alternatively, the navigation device 7 and the case 8 can be installed previously in the vehicle body, with the desired audio devices positioned within the case 8. In this arrangement, operative installation of the control assembly can be accomplished by installing the control casing 1, the control device board 2, the display board 3, the audio control element 4, the climate control element 5, and the navigation control element 6, and connecting the appropriate wire harness to the audio devices. In any event, the control assembly of the present invention provides for reduction of the number of assembling and installing steps required, which correspondingly produces an improvement in productivity and decrease in production costs.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. A control assembly comprising:

a control casing having a cover surface and a plurality of openings therein;

an input-output section having a surface upon which are mounted a plurality of control elements operative to control a plurality of vehicle occupant systems, wherein each of said plurality of control elements is operably disposed on said cover surface through one of said plurality of openings.

2. A control assembly comprising:

a first casing having a surface, said first casing supporting a plurality of control devices to control a plurality of vehicle occupant systems;

a plurality of occupant engageable control elements disposed on said surface to selectively operate said plurality of control devices; and a control casing having a cover surface and defining a plurality of openings therein complementary to said plurality of engageable control elements for manual operation thereof, said first casing being formed to be secured to said control casing.

3. The control assembly according to claim 2, wherein said control devices are to control a climate control system and an audio system.

4. The control assembly according to claim 3, wherein said control devices are to control a navigation system.

5. The control assembly according to claim 2, wherein said input-output section includes a control device board having control devices to control a climate control system and an audio system, and said input-output section further includes a navigation control device board having control devices to control a navigation system.

6. The control assembly according to claim 5, further including a navigation control device cover, and wherein said control casing defines a navigation control device cover receiving portion for mounting of said navigation control device cover thereon.

7. The control assembly of claim 2, wherein said control casing defines a cavity opening into an interior compartment for mounting of a display screen.

8. The control assembly of claim 7, wherein said control casing includes a wall portion defining the cavity to orient the display screen in recessed disposition with respect to the interior compartment.

9. The control assembly of claim 2, wherein said engageable control elements include a flexible switch cover having a plurality of switch cover portions connected by a flexible web.

10. A control assembly comprising:
an input-output section including a control device board, said input-output section having mounted thereon a plurality of control devices to control a climate control system and an audio system;
a plurality of switches each to operate selectively at least one of said plurality of control devices; and
a control casing having a cover surface formed to face an interior compartment, said control casing defining a plurality of openings therein, each of said plurality of opening receiving one of said plurality of switches for manual operation to control the climate control system and the audio system, said control device board being formed to be secured to said control casing.

11. The control assembly of claim 10, wherein said input-output section includes a display control board having mounted thereon a plurality of display control devices to control a screen display and a navigation system, said display control board being formed to be secured to said control casing, said switches including switch members to selectively operate said plurality of display control devices, and said control casing defining a cavity for mounting of an occupant viewable display screen in recessed orientation with respect to the interior compartment.

12. An integrally packaged control assembly comprising:
an input-output section including a plurality of control devices to control a plurality of occupant systems;
a plurality of occupant engageable control elements to selectively operate said plurality of control devices; and
an integral control casing facing an interior compartment and defining a plurality of openings complementary to and in which said engageable control elements are received for operation by an occupant to control the plurality of vehicle occupant systems, said input-output section being secured to said control casing.

13. The integrally packaged control assembly of claim 12, wherein said control casing defines a cavity opening into the interior compartment for mounting of a display screen for viewing by an occupant.

14. A method of installing a control assembly comprising:
assembling into an integral assembly a plurality of control elements adapted to control the operations of a plurality of vehicle occupant systems, an input-output section adapted to receive operation signals from the plurality of control elements and to transmit control signals in response to the operation signals for controlling the plurality of vehicle occupant systems, and a control casing having a cover surface; and
securing said integral assembly so that the cover surface faces an interior compartment.

15. A method of installing a control assembly comprising:
providing an input-output section including a plurality of control devices each for controlling at least one of a plurality of vehicle occupant systems, a plurality of occupant engageable control elements for selectively operating the plurality of control devices, and a control casing defining complementary openings for receiving the control elements;
forming an integral assembly by securing together the input-output section, the plurality of engageable control elements, and the control casing so that the engageable control elements are received within the openings of the control casing and oriented to be operable manually; and
installing the integral assembly by securing it to a vehicle body and operatively connecting the control devices to at least one of the plurality of vehicle occupant systems.

16. The method of claim 15, wherein forming the integral assembly includes securing an audio device to the control casing.

17. The method of claim 15, further comprising installing an audio device within the vehicle body, and wherein installing the integral assembly includes operatively connecting a plurality of control devices to the installed audio device.

18. A control assembly comprising:
a first casing;
a control board having a plurality of control elements, the control board mountable to the first casing;
at least one flexible control element cover having a shape complementary to at least one of the plurality of control elements; and
a control casing having openings complementary to the plurality of control elements, wherein the at least one flexible control element is positioned between the control board and the control casing.

19. The control assembly of claim 18, wherein the at least one flexible control element cover is formed to cover more than one control element.

20. The control assembly of claim 19, wherein the at least one flexible control element cover is formed with portions complementary to the plurality of control buttons, the portions being connected by a flexible web.

21. The control assembly of claim 20, wherein the control board is mounted to the first casing, the control board and first casing are mounted to the control casing such that the plurality of control elements extend through the openings complementary to the plurality of control elements, and the at least one flexible control element cover is between the control board and the control casing wherein the at least one flexible control element cover covers corresponding ones of the plurality of control elements.

* * * * *